United States Patent
O'Carroll

(10) Patent No.: US 6,714,794 B1
(45) Date of Patent: Mar. 30, 2004

(54) COMMUNICATION SYSTEM FOR WIRELESS COMMUNICATION OF CONTENT TO USERS

(75) Inventor: Finbarr Michael O'Carroll, Ocean Ridge, FL (US)

(73) Assignee: Motorola, Inc., Schaumburg, IL (US)

( * ) Notice: Subject to any disclaimer, the term of this patent is extended or adjusted under 35 U.S.C. 154(b) by 361 days.

(21) Appl. No.: 09/697,951

(22) Filed: Oct. 30, 2000

(51) Int. Cl.[7] .................................................. H04Q 4/20
(52) U.S. Cl. ........................ 455/466; 455/456; 455/457
(58) Field of Search ................................. 455/466, 456, 455/424, 427, 432, 433, 440, 457, 403, 566, 414, 62, 63, 67.4, 422; 370/465, 468

(56) References Cited

U.S. PATENT DOCUMENTS

| | | | |
|---|---|---|---|
| 5,546,411 A | | 8/1996 | Leitch et al. |
| 5,590,405 A | * | 12/1996 | Daly et al. ................... 455/504 |
| 5,729,557 A | * | 3/1998 | Gardner et al. .............. 714/774 |
| 5,821,987 A | | 10/1998 | Larson |
| 5,990,955 A | | 11/1999 | Koz |
| 6,014,568 A | * | 1/2000 | Alperovich et al. ......... 455/456 |
| 6,157,948 A | | 12/2000 | Inoue et al. |
| 6,253,063 B1 | * | 6/2001 | Cudak et al. .................. 455/63 |
| 6,351,456 B1 | | 2/2002 | Struhsaker et al. |
| 6,363,249 B1 | * | 3/2002 | Nordeman et al. .......... 455/418 |
| 6,363,339 B1 | * | 3/2002 | Rabipour et al. ............ 704/201 |
| 6,462,708 B1 | * | 10/2002 | Tsujimoto et al. ...... 342/357.09 |
| 6,473,597 B1 | * | 10/2002 | Johnson ........................ 455/63 |

* cited by examiner

Primary Examiner—Pablo N Tran
(74) Attorney, Agent, or Firm—Philip P. Macnak; Daniel C. Crilly; Sylvia Chen

(57) ABSTRACT

A communication system (10) provides content to communication devices (12) over one or more wireless channels that support packet data communication under a specified radio packet data transmission protocol, such as GPRS. The communication system (10) receives proximity and functionality information from the communication devices (12). Based on the proximity and functionality level information, the communication system (10) determines an optimum data rate and optimum content format for communicating the content with the communication devices (12). Using the optimum data rate and content format, the content is transmitted to the communication devices (12) over a wireless channel, thereby optimizing the air time and providing the best user experience regardless of communication device capability or position.

16 Claims, 6 Drawing Sheets

COMMUNICATION SYSTEM FOR WIRELESS COMMUNICATION OF CONTENT TO USERS

FIELD OF THE INVENTION

The present invention generally relates to the field of communication systems, more particularly to communicating content over wireless channels.

BACKGROUND OF THE INVENTION

Communication systems that communicate voice and data messages are extensively used in telephony and wireless communication systems. For example, European Telecommunication Standard Institute (ETSI) has specified a Global Standard for Mobile Communication (GSM) that uses time division multiple access (TDMA) to communicate control, voice and data information over wireless radio frequency (RF) channels. In the U.S., Telecommunication Industry Association (TIA) has published a number of Interim Standards, such as IS-136, that define various versions of digital advanced mobile phone service (D-AMPS), and analog advanced mobile phone service (A-AMPS), with the capability of transmitting voice and data to subscribers.

General Packet Radio Service (GPRS) is a non-voice value added service that allows information to be sent and received across GSM as well as the IS-136 systems. GPRS supplements today's Circuit Switched Data and Short Message Service (SMS) of the GSM at theoretical maximum speeds of up to 171.2 kilobits per second (kbps) using eight timeslots at the same time. Because of the spectrum efficiency of GPRS, there is less need to build in idle capacity that is only used in peak hours. GPRS therefore lets network operators maximize the use of their network resources in a dynamic and flexible way, along with user access to resources and revenues.

GPRS involves overlaying a packet based air interface on the existing circuit switched GSM network, thereby giving end users an option to use a packet-based data service. With GPRS, the information is split into separate but related "packets" before being transmitted and reassembled at a receiving end. Because of packet switching configuration of GPRS, radio resources are used only when end users are actually sending or receiving data. Rather than dedicating a radio channel to an end user communication device for a fixed period of time, the available radio resource can be concurrently shared between several communication devices, thereby allowing a large number of GPRS users to share the same bandwidth within a single cell. The actual number of users supported depends on the application being used and how much data is being transferred.

High immediacy is a very important feature for time critical applications. Subject to radio coverage, GPRS also facilitates instant connections whereby information can be sent or received immediately as the need arises. GPRS also facilitates new applications not previously available over GSM networks due to the limitations in speed of Circuit Switched Data (9.6 kbps) and message length of the Short Message Service (160 characters). For example, GPRS enables Mobile Internet functionality by allowing interworking between the existing Internet and a GPRS-enabled network. As such, any service that is used over the fixed Internet today, for example, File Transfer Protocol (FTP), web browsing, chat, email, telnet, can also be available over the GPRS-enabled network.

The World Wide Web is becoming the primary communications interface, with users accessing the Internet for entertainment and information collection, the intranet for accessing company information and connecting with colleagues, and the extranet for accessing customers and suppliers. Hence, web browsing and providing web content are two important applications for GPRS. Because GPRS uses the same protocols as the Internet, the GPRS network can be viewed as a sub-network of the Internet with GPRS-enabled communication devices being viewed as mobile hosts. This means that each of the GPRS-enabled communication devices can have its own EP address and be addressable as such.

It is known to transmit content comprised of data packets to communication devices over wireless channels. Conventional systems however communicate tailored content to communication devices that have known functionality. In other words, the features of the communicated content is tailored to the functionality level of each of the communication devices. With the wide spread acceptance of communication devices, the manufacturers offer such devices on various platforms with different degrees of processing and display functionality. As a result, the content can not be easily tailored to support all of the available functionality levels the of communication devices. Consequently, depending on the functionality level, full features of the content can not be presented to all end users. For example, a communication device may not be able to support the functionally of the incoming content data or simply may not be able to process the data at the incoming data rate.

When data packets representing a graphical content, for example, a moving graphic content, are sent to a communication device at a rate defined by a sender, a basic communication device may not have the processing capability to properly present the content to the end user. Even a more advanced communication device may not be able to communicate with the sender at a required data rate because of its proximity to the sender. In either case, the sender, which is unaware of the capability of the various communication devices, is forced to transmit the data packets without regards to whether the associated content of the packets are properly presented to end users. The ambiguity in transmitting complex data at random data rates leads to errors that result in termination of data transfer for some end users, with the generated errors also significantly contributing to inefficient use of valuable radio bandwidth due to retransmissions caused by the errors.

Accordingly, there exists a need to properly present content that is communicated over wireless channels to end users with optimum use of the radio bandwidth.

DETAILED DESCRIPTION OF THE INVENTION

Figure 1:
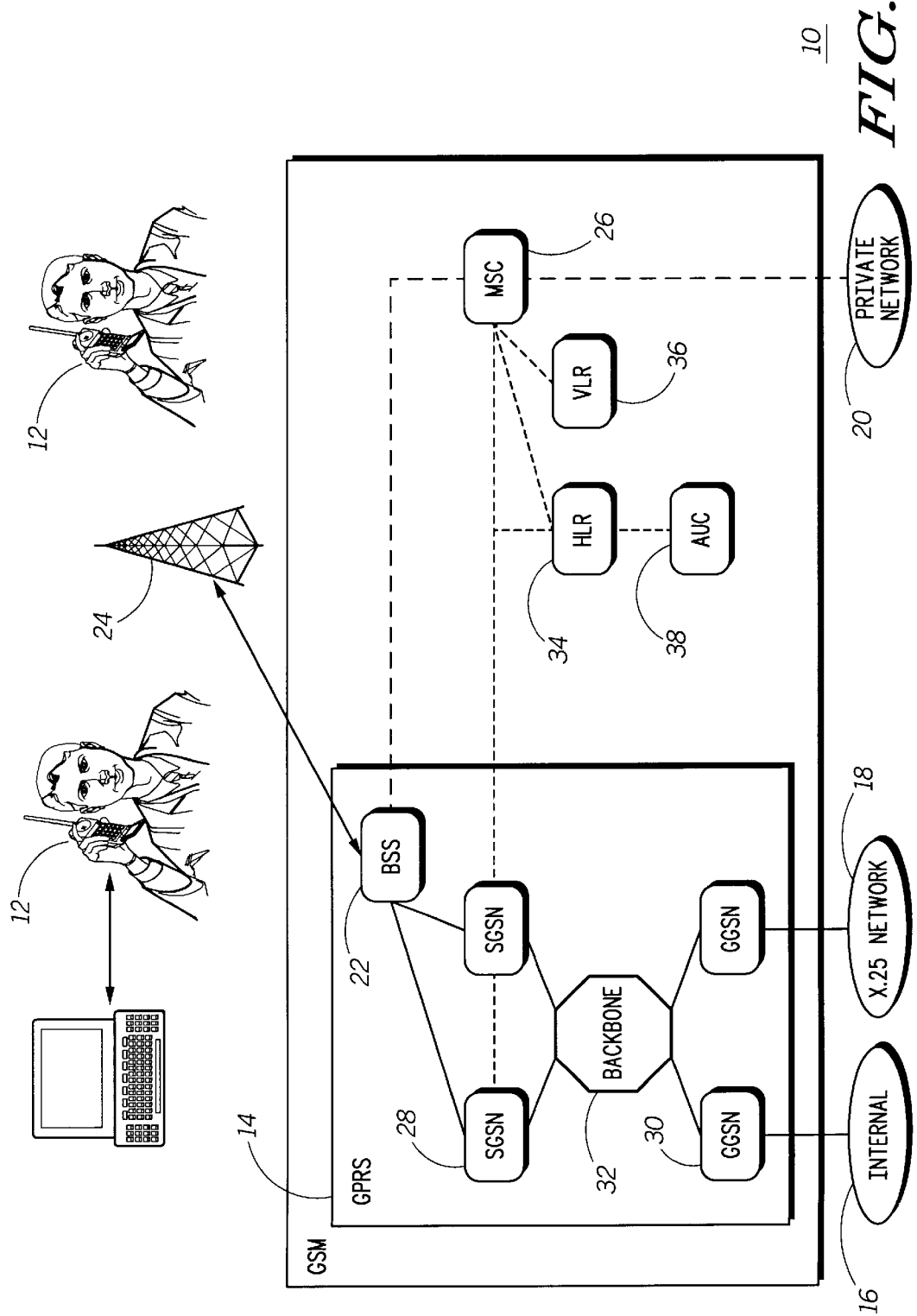
FIG. 1 illustrates a block diagram of a communication system within which the present invention is advantageously used.

The present invention relates to a communication system that provides content to communication devices over one or more wireless channels. In an exemplary embodiment of the invention, the wireless channels support packet data communication under a specified radio packet data transmission protocol, such as GPRS. As such the content can be communicated with the communication device as data packets that are transmitted over an air interface, such as GSM or IS-136 air interface or any other air interface that supports packet data transmissions.

The communication system receives proximity information and functionality level information from a communication device. The functionality level information can for example relate to communication device's processing or content display capabilities. The proximity information can for example correspond to a received signal strength from the communication device at a communication system base station. Alternatively, the proximity information can be transmitted from the communication device in terms of coordinates corresponding to a defined positioning system. Based on the proximity and functionality level information, the system determines an optimum data rate and content format for communicating the content with the communication device. Using the optimum data rate and content format, the content is transmitted to the communication device over a wireless channel, thereby optimizing the air time.

As such, the system can adjust the number of data packets that are transmitted for representing the content based on the functionality level information of the communication device. For example, the number of communicated data packets can be reduced if the functionality level of the content is higher than the functionality level of the communication device.

According to one of the more detailed features of the invention, the data packets are communicated with control information that define the content, format. The content format specifies how the content is presented or displayed at the communication device. For example, if the content comprises a graphic content made up of a number of data packets that correspond to graphic images, the graphic content is transmitted with control information that include at least one of number of graphic images, size of each graphic image, graphic display speed, screen size format of each graphic image, and functionality level of the graphic content. Similarly, audio or any other type of content may be communicated with corresponding control information. Based on the control information, which define the content format, determination is made at the communication device as to how to present the content to the user.

The way in which the content is presented to the user can be determined either at the communication system level or at the communication device level. For example, upon receipt of the functionality level information, the communication system can determine how to present the content to the user. The communication system can adjust the number of data packets representing the content to a level that can be handled by the communication device. Alternatively, the communication system can transmit all of content data packets to the communication device, where the device would only use a number of the data packets commensurate with its functionality level to present the content to the user.

A communication device in accordance with the present invention includes a transmitter that transmits proximity information and functionality level information (e.g., processing or displays capability) to the communication system. As stated above, the proximity information can be based on a transmitted communication signal from the communication device and received at the communication system, whereby the received signal strength indicates the proximity information. Alternatively, the proximity information can be based on a positioning receiver such as GPS receiver in the communication device. The communication device also includes a receiver that receives one or more content data packets transmitted based on the proximity and functionality level information. The data packets are received with control information that are processed by a controller to present or display the content data packets at the communication device. The moving graphic content comprising a number of graphic image data packets can for example be displayed as still images at the communication device, when the functionality level of the graphic content is higher than the functionality level at the communication device.

Referring to FIG. 1, a block diagram of a communication system 10 that advantageously incorporates the present invention is shown. The communication system 10 is by way of example a GSM communication system, which provides wireless voice and data communication capability for a plurality of communication devices 12. The mode of operation of a GSM communication systems 10 is described in European Telecommunication Standard Institute (ETSI) documents ETS 300 573, ETS 300 574 and ETS 300 578. Therefore, the operation of the communication system 10 is described only to the extent necessary to enable one skilled in the art to make and use the present invention. Although the present invention is described as embodied in a GSM system, those skilled in the art would appreciate that a wide variety of other communication systems, such as those based on Personal Digital Cellular (PDC), Digital Advanced Mobile Phone Service (D-AMPS), or Universal Mobile Telecommunication Standard (UMTS), or Code Division Access (CDMA) standards, can also be utilized. Similarly, the mobile packet data service of the invention can be based on other standards, such as Cellular Digital Packet Data (CDPD) or UMTS packet data.

The communication system 10 is designed as a hierarchical network with multiple levels for managing calls and transmission of voice and packet data. Using an allocated set of uplink and downlink RF channels, a number of communication devices 12 operating within the communication system 10 participate in calls using allocated time slots that form logical communication channels. At a higher hierarchical level, a group of Mobile Service Switching Center (MSCs) 26 (only one is shown) are responsible for the routing of calls from an originator to a destination. In particular, they are responsible for setup, control and termination of calls and broadcasting of text messages.

At a lower hierarchical level, each MSC 26 is connected to a group of base station subsystems (BSS) 22 (only one is shown). The primary function of a BSS 22 is radio resource management. For example, based on reported received signal strength at the communication devices 12, the BSS 22 determines whether to initiate a hand over. Under the GSM standard, the BSS 22 communicates with the MSC 26 using a standard interface known as the A-interface. At a still lower hierarchical level each one of the BSS 22 control a group of base transceiver station (BTS) 24. Each BTS 24 includes a number of transceivers (TRXs) that use the uplink and downlink RF channels to serve a particular common geographical area. Therefore, The BTS 24 primarily provide the RF links for the transmission and reception of data bursts to and from the communication device 12 within their designated cell.

In an exemplary embodiment, the mobile data messaging service of the communication system 10 is provided by a GPRS defined standard. A GPRS network 14 deployed in the communication system 10 utilizes the existing GSM nodes, in addition to others, for supporting packet switching, and inter-working with existing packet data networks, such as Internet 16, X-25 networks 18 and a private networks 20. In this way, various types of content, such as image content made up of moving images, can be communicated to the communication devices 12. The communication devices 12 are also equipped to handle GPRS provided mobile packet data service, in addition to handling voice service. Examples of such communication devices 12 include smart phones, Personal Digital Assistances (PDA), or portable computers, such as a lap tops, or palm tops that operate with or without a cellular telephone.

While voice traffic is noted to the MSC 26, GPRS packets carrying the various types of content are sent from the BSS 22 to a Serving GPRS Support Node (SGSN) 28. The SGSN 28 is the node within the GSM infrastructure that sends and receives packet data to and from the communication devices 12, while keeping track of the communication devices 12 within a covered service area. The SGSN 28 communicates with a Gateway GPRS Support Node (GGSN) 30, via a backbone network 32, which is a system that maintains connections with other networks such as the Internet 16, X.25 networks 18 or private networks 20. The GPRS network 14 can use multiple serving nodes, but requires only one gateway node for connecting to an external network such as the Internet 16.

The communication devices 12 send packets of data via the SGSN 28 to the GGSN 30, which converts them for transmission over a desired network. As mentioned above, the desired network could be the Internet 16, X.25 networks 18 or private networks 20. For example, data packets representing web content and images from the Internet 16 addressed to the communication devices 12 are received by the GGSN 30, forwarded to the SGSN 28 and then transmitted to the communication devices 12. To forward IP or X.25 packets between each other, the SGSN 28 and GGSN 30 encapsulate these packets using a specialized protocol called the GPRS tunnel protocol (GTP), which operates over the top of standard TCP/IP protocols.

The MSC 26 and SGSN 28 are associated with corresponding Home Location Registers (HLR) 34 and Visitors Location Registers (VLR) 36, which maintain user/subscriber information for roaming and billing purposes. An Authentication Center (AUC) 38 provides authentication functionality when placing voice and data calls. As illustrated by the dotted lines, the VLR 36 and HLR 34 and AUC 38 need not be physically associated with the location of a MSC 26 or SGSN 28, since the network gives full connectivity to all of the associated components and nodes. Generally, the MSC 26 is also connected to a public switching telephone network (PSTN), to give connectivity between fixed landline subscribers and mobile subscribers.

Figure 2:
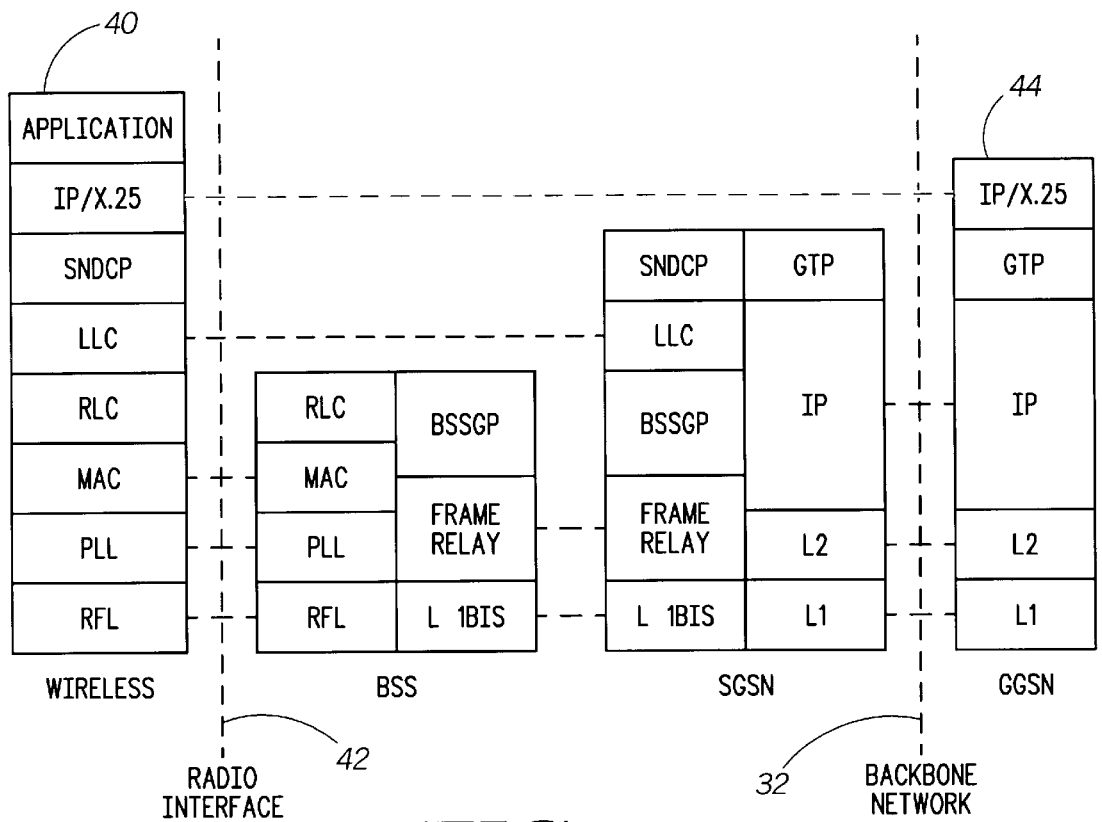
FIG. 2 illustrates a GPRS protocol stack used in the communication system of FIG. 1.

Referring to FIG. 2, communication protocol stack 40 for communicating data packets between the communication system 10 and the communication devices 12 is shown. Among other things, the communication protocol stack 40 comprises: a sub-network dependent control protocol (SNDCP) layer that encrypts and compresses data packet segments; a logical link control (LLC) layer that links an underlying air or radio interface to the SGSN 20; a radio link control (RLC) layer that supports error correction; a medium access control (MAC) layer that supports slotted ALOHA scheme; a physical link sub-layer (PLL) that frames and codes the packets and also manages the physical medium error; and a radio frequency layer (RFL) that modulates and demodulates the transmitted packet over the radio frequency channels. The details of the SGSN 28 and GGSN 30 are both invisible and irrelevant to the user who simply experiences a straightforward IP or X.25 connection that just happens to be wireless. As stated above, the radio frequency channels in the GSM/GPRS implementation are divided into repetitive frames comprising 8 time slots. At the radio interface 42 the IP/X.25 packet within the communication protocol stack 40 is converted to a corresponding IP/X.25 packet within the protocol stack 44 used in a wired network.

Figure 3:
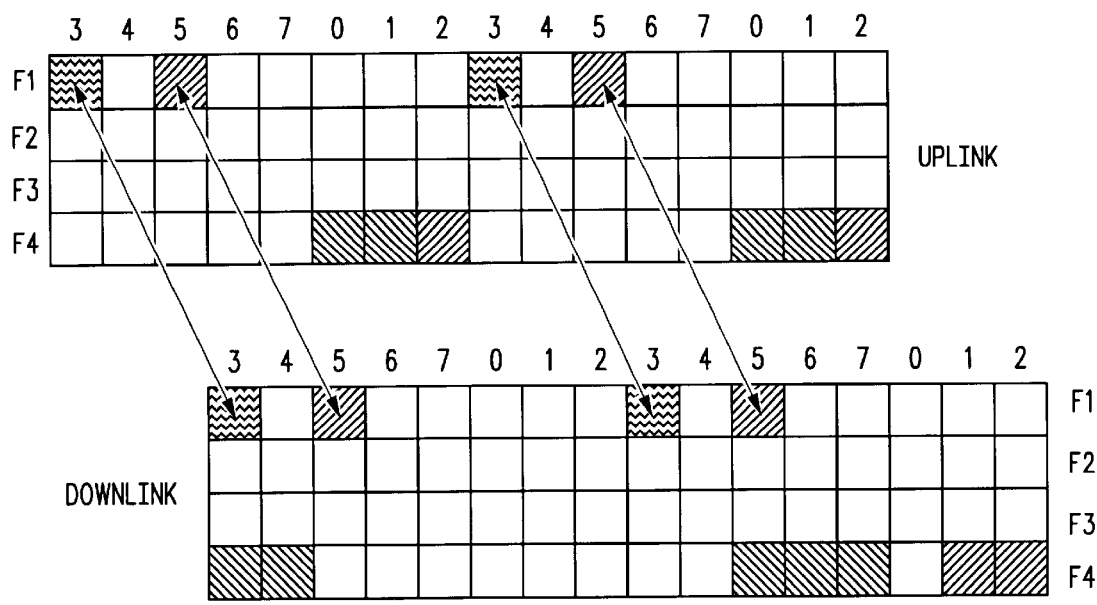
FIG. 3 illustrates a diagram for a GPRS air interface in the communication system of FIG. 1.

Referring to FIG. 3, a diagram illustrates the air interface for the communication system 10. As shown, the communication channels comprise radio frequency (RF) channels having specified carrier frequencies. In the communication system 10, an RF channel (uplink or downlink) is divided into repetitive time frames during which voice and date are communicated. Each frame, which can be a super-frame or a hyper-frame, is further divided into time slots or logical channels that carry packets of information. Speech is transmitted during logical channels designated as traffic channels (TCH). All signaling functions pertaining to call management in the system, including initiation, hand over, and termination are handled via information transmitted over signaling channels, which can be dedicated or associated signaling channels. The functions of some of the dedicated signaling channels are:

Broadcast Control Channel (BCCH), which is transmitted at the first time slot (time slot 0) of the downlink RF channel, provides the communication devices with information about the BTSs, such as a BTS identity.

Standalone Dedicated Control Channel (SDCCH), which is transmitted at a time slot adjacent to the BCCH, is used for registration, location updating, authentication and call set-up.

Paging channel is a downlink only channel, for informing the mobile unit of a network signaling requirement, for example when the communication device is called.

Access Grant Channel is a downlink only channel used for replies to access requests, for assigning a dedicated control channel for subsequent signaling.

Some of the individual functions of the associated signaling channels are fined below:

Slow Associated Control Channel (SACCH) is used for communicating control and supervisory signals associated with a number of traffic channels, including the transmission of an RX-QUAL parameter that corresponds to a measure of bit error, and an RX-LEV parameter that correspond to a measure of received signal strength at the mobile unit.

Fast Associated Control Channel (FACCH) steals time slots allocated for associated traffic channels for control requirements, such as handover.

Figure 4:
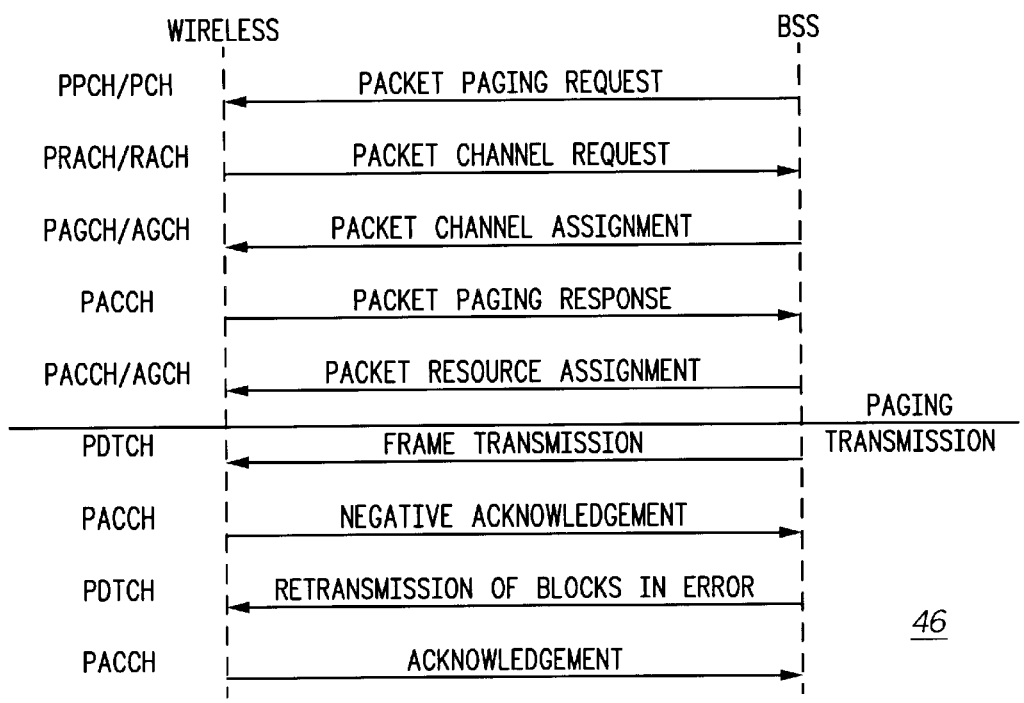
FIG. 4 illustrates a sequential diagram for a base station initiated data transfer in the communication system of FIG. 1.

Referring to FIG. 4, a sequential diagram illustrates a base station initiated data transfer 46 in accordance with the present invention. In the data transfer, the base station subsystem 22 (BSS) sends a packet paging request to the communication devices 12 to initiate the data transfer 46 process. In response, the BSS 22 assigns and transmits a packet channel assignment to the communication device 12. In response to the communication devices 12 sending a packet paging response and receiving a packet resource assignment, the BSS 22 transmits content and non-content relates packet data and continues with various acknowledgements and error checks for presenting content to a user in accordance with the present invention.

Figure 5:
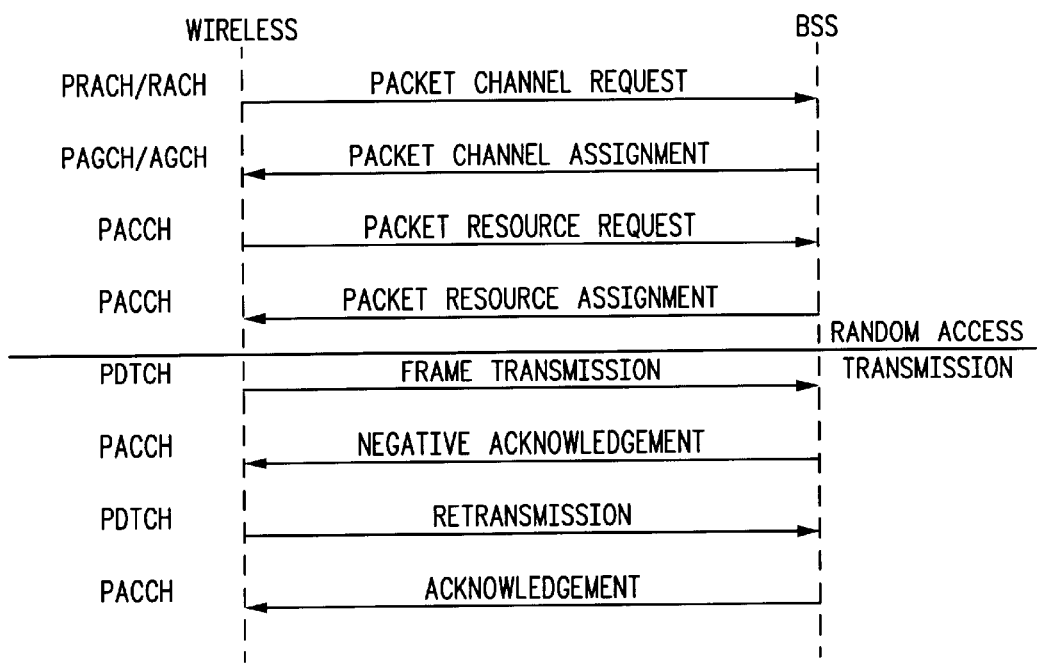
FIG. 5 illustrates a sequential diagram for a communication device initiated data transfer in the communication system of FIG. 1.

Referring to FIG. 5, a sequential diagram illustrates a communication device initiated data transfer 48 in accordance with the present invention. In the communication device initiated data transfer 48 process, the communication devices 12 send a packet channel request to the BSS 22, requesting a transmission frequency channel and time slots. Once the communication devices 12 receive the packet frequency channel assignment, the communication devices 12 send a packet resource request, referred to as a communication resource allocation request, to the BSS 22. The BSS 22 then assigns resources to the communication device 12 which can, for example, correspond to a number assigned time slots. The communication devices 12 then transmit and receive packet data and continue with the various acknowledgements and error checks which completes content communication in accordance with the present invention.

Figure 6:
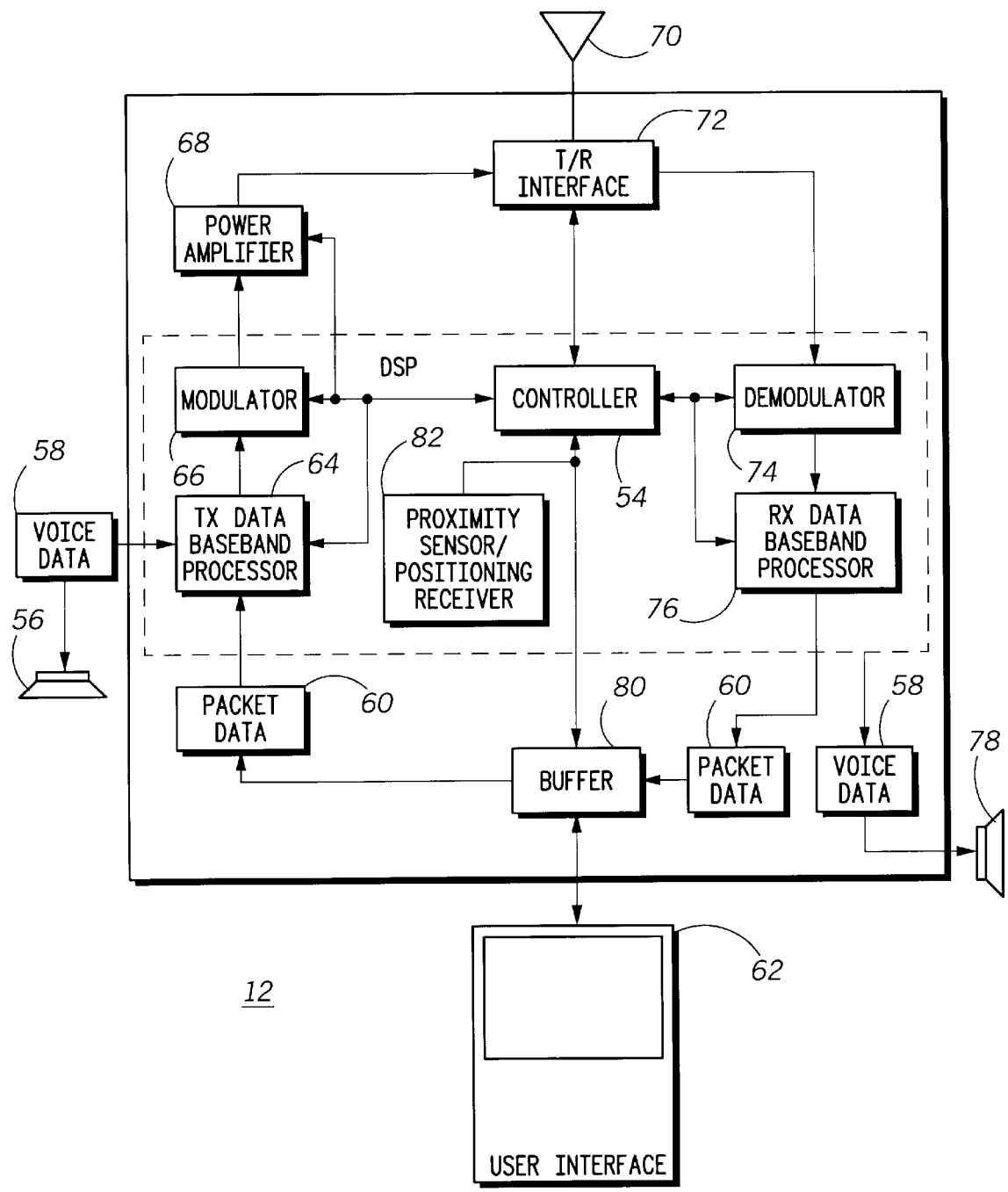
FIG. 6 illustrates an electrical block diagram of a communication device in accordance with the present invention.

Referring to FIG. 6, a block diagram of one of the communication devices 12 that incorporates the present invention is shown. Along with a voice service, the communication devices 12 support a data service. Using the data service, a communication device user can be presented with Web content for example over the RF channels. In the preferred embodiment of the present invention, the communication devices 12 are portable two-way devices that operates in transmit and receive modes for communicating voice data and content and non-content packet data over one or more RF channels. In one exemplary embodiment, the communication devices 12 can be operating within the communication system 10 of FIG. 1, which provides a voice and data service within a coverage area using the GSM/GPRS protocols. As stated above, the communication devices 12 can be employed in a wide range of communication systems 10, including systems that are based on the GSM and IS-136 standards. With any one of these systems, a user can use the communication devices 12 of the present invention to establish voice and data service.

The communication devices 12 operate under the control of a controller 54 which provides a duplex data communication under a specified communication protocol. In the exemplary embodiment of the present invention, the controller 54 is programmed to provide the duplex communication service under radio frequency channels that are divided into repetitive time frames. Under GSM protocol, for example, each time frame is divided into 8 time slots.

In the transmit mode, the communication devices 12 include a microphone 56 that produces a voice signal that corresponds to the user's voice. The voice signal is converted to voice data 58. The communication devices 12 under the control of the controller 54 also produces packet data 60, for example, based on user input as received from a user interface 62. A transmit-data baseband processor 64 processes the voice data 58 and packet data 60 originated at the communication device 12. Based on a specified modulation technique, a modulator 66 modulates the baseband-processed voice data 58 and packet data 60 to produce a modulated signal. A power amplifier 68 amplifies the modulated signal to generate an amplified modulated communication signal at a specified frequency or frequency spectrum. The amplified communication signal is radiated via an antenna 70 through an TX/RX interface 72 that facilitates the duplex data communication under the control of the controller 54. The antenna 70 can be any one of an antenna known to those skilled in the art, for example, a monopole antenna, a dipole antenna, an array of dipole antennas, a micro strip antenna, and a plasma antenna.

In the receive mode, the communication devices 12 receive electromagnetic radiation at the antenna 70. The received electromagnetic signal received at the antenna 70 is demodulated using a demodulator 74 and is coupled to a receive-data baseband processor 76 through to the TR/RX interface 72. The communication signal is segregated into the content packet data 60 and the voice data 58 using the receive-data baseband processor 76. The voice data 58 is properly routed to a speaker 78 in order to convert the communication signal into audible sound. The content packet data 60 is routed to a buffer 80, which manages the packet data 60. The content packet data 60 can then be loaded onto the user interface 62 for user interaction, for example, to present images to the user on a display device. The communication devices 12 can also include a proximity sensor or a positioning receiver 82 that provide proximity information, e.g., coordinates of the communication devices 12, to the controller 54. It would be appreciated that the data processing and control functions can be incorporated into a well-known DSP that is programmed to for example perform baseband processing and other functions.

Figure 7:
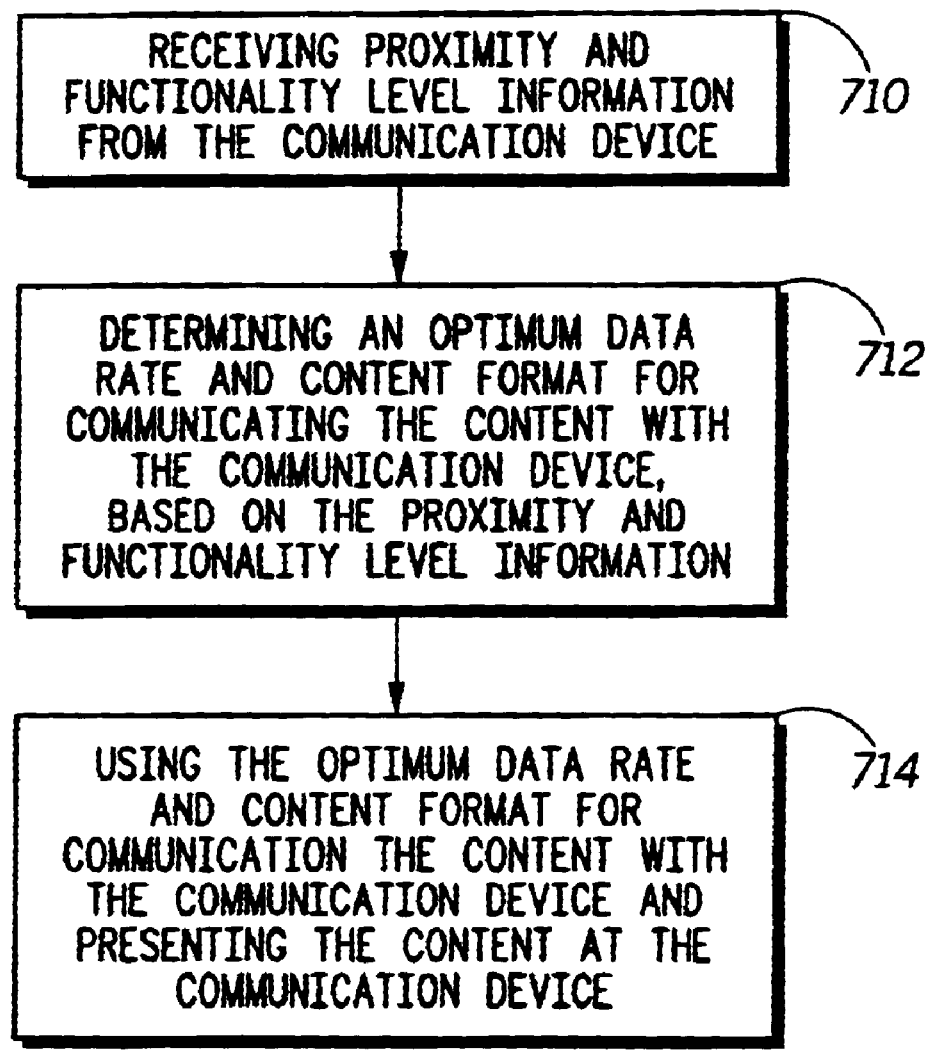
FIG. 7 illustrates a flow diagram for a method for communicating content in accordance with the present invention.

Referring to FIG. 7, the flow chart of a method for communicating content in accordance with the present invention is shown. The method involves receiving proximity and functionality level information from the communication device, block 710. As stated above, the functionality level information can, for example, include data processing and/or display level functionality at the communication device. The communication device can provide the proximity information based on a transmitted signal the received strength of which at the BSS 22 relates to its proximity. Alternatively, the controller 54 may cause the transmission of the proximity information in the form of data packets that relate to received data from the proximity sensor or a positioning receiver 82. The method of the present invention also involves determining an optimum data rate and content format for communicating the content with the communication device, based on the proximity and functionality level information, block 712. The method uses the optimum data rate and content format for communicating the content with the communication device and presenting the content at the communication device, block 714. As used herein, content may comprise a wide range including but not limited to graphic, video, audio, multi-media, text content or any combination thereof.

The functionality and or proximity information can be embedded in the protocol specification, which would drive an optimal user experience across devices of varying functionality regardless of position in the network. For example, the GPRS protocol specifies a QoS (Quality of Service), which can be used for determining the optimum data rate under the present invention. That is, a suitable QoS that provides an optimum data rate may be selected based on the proximity information for presenting the content to the user of the communication device.

Figure 8:
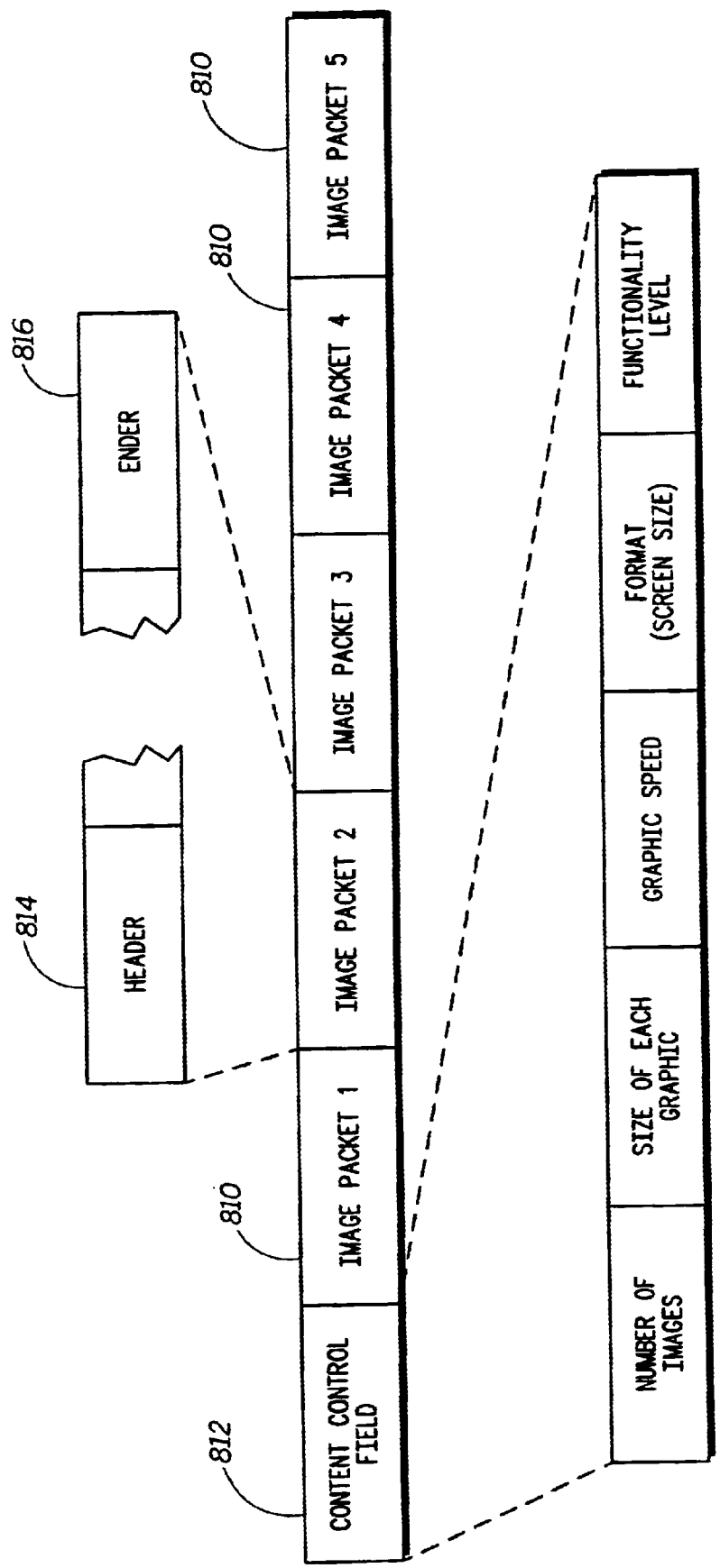
FIG. 8 illustrates a data packet diagram for communicating content in accordance with the present invention.

Referring to FIG. 8, a diagram of a data stream for a graphic content consisting of 5 individual graphic images is shown. As shown, each graphic image in represented by a image data packet 810 that together form the graphic content. The graphic content, which can, for example, correspond to a moving graphic advertisement, is communicated with appropriate control information 812 that indicate the content format. The content format defines how the individual image packets presented to the user. For example, the content format may define how the images are synchronized with each other to form a moving graphic image. Each image data packet 810 is suitably formatted with headers 814 and enders 816. The control information 812 defining the content format can include one or more of the number of graphic images, sized of each graphic image, graphic display speed, screen size format of each graphic image, and functionality level of the graphic content.

In those areas where the data rate is acceptable and the device functionality level is adequate, the content format provides for complete data stream containing the 5 individual image data packets 810 as well as the control information 812 is sent to the communication device for presenting the image content to the user. However, when a supported data rats is not adequate, for example, when the communication device is further from a BTS and the feasible data rate is lower, the number of communicated graphic packets is reduced. For example, only one image data packet 810 can be transmitted with appropriate control information 812 for the communication device to display the graphic content as a still image. In case the graphic content has a higher functionality level and the device has basic functionality level, for example, when the communication device can display still images only but can not accommodate moving images because of display or processing limitations, the number of communicated image packets is reduced to accommodate the device functionality.

From the foregoing description it would be appreciated that the present invention allows communication devices to receive content in some format regardless of functionality or proximity, providing optimum user experience regardless of device capability or position. The present invention also allows for maintaining air time capacity at an optimal level by increasing probability of message reception without errors.

I claim:

1. A communication system that provides content to communication devices over a wireless channel, comprising:
   a receiver that receives proximity information and display functionality level information associated with a communication device;
   a controller that, based on the proximity information, determines an optimum data rate and, based on the display functionality level information, determines an optimum content format for communicating the content over the wireless channel; and
   a transmitter that uses the optimum data rate and optimum content format for transmitting the content to the communication device over the wireless channel.

2. The communication system of claim 1, wherein the optimum data rate corresponds to a Quality of Service (QoS) offered by the communication system.

3. The communication system of claim 1, wherein the content comprises one or more data packets that are communicated in accordance with a specified radio packet data transmission standard.

4. The communication system of claim 3, wherein the one or more data packets are communicated with control information that defines the optimum content format for presenting the content at the communication device.

5. The communication system of claim 4, wherein the one or more data packets that are transmitted in accordance with the optimum content format is adjusted based on at least the display functionality level information.

6. The communication system of claim 3, wherein the content comprises graphic content.

7. The communication system of claim 6, wherein the graphic content comprises a number of data packets that correspond to graphic images.

8. The communication system of claim 7, wherein the graphic content is transmitted with control information that includes at least one of: a number of graphic images, size of each graphic image, graphic display speed, screen size format of each graphic image, and functionality level of the graphic content.

9. The communication system of claim 7, wherein the number of data packets representing graphic images which are communicated is reduced when the functionality level information of the graphic content is higher that the display functionality level information of the communication device.

10. A communication device, comprising:
    a transmitter that transmits proximity information and display functionality level information to a communication system;
    a receiver that receives one or more data packets representing a content from the communication system based on the proximity information and the display functionality level information, wherein the one or more data packets are received with control information which defines how the content is presented at the communication device; and
    a controller that, based on the control information, presents the content at the communication device.

11. The communication device of claim 10, wherein the one or more data packets are communicated in accordance with a Quality of Service (QoS) offered by a communication system.

12. The communication device of claim 11, wherein the content comprises graphic content.

13. The communication device of claim 12, wherein the graphic content comprises a number of data packets that correspond to graphic images.

14. The communication system of claim 13, wherein the control information which is received includes at least one of: number of graphic images, size of each graphic image, graphic display speed, screen size format of each graphic image, and functionality level of the graphic content.

15. The communication device of claim 14, wherein the graphic content is displayed as still images.

16. A method of communicating content with a communication device over a wireless channel comprising the steps of:
    receiving proximity information and display functionality level information from the communication device;
    determining an optimum data rate based on the proximity information;
    determining a content format based on the display functionality level information; and
    communicating the content with the communication device using the optimum data rate and the content format.

* * * * *